US008099410B2

(12) United States Patent
Day et al.

(10) Patent No.: US 8,099,410 B2
(45) Date of Patent: *Jan. 17, 2012

(54) OPTIMIZING EXECUTION OF DATABASE QUERIES CONTAINING USER-DEFINED FUNCTIONS

(75) Inventors: Paul Reuben Day, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 677 days.

This patent is subject to a terminal disclaimer.

(21) Appl. No.: 12/175,667

(22) Filed: Jul. 18, 2008

(65) Prior Publication Data

US 2008/0275858 A1 Nov. 6, 2008

Related U.S. Application Data

(63) Continuation of application No. 10/901,610, filed on Jul. 29, 2004, now Pat. No. 7,447,680.

(51) Int. Cl.
*G06F 17/30* (2006.01)
(52) U.S. Cl. ........................................ 707/718; 707/802
(58) Field of Classification Search .................. 707/802, 707/803, 810, 811, 720, 718–719, 723, 749, 707/715
See application file for complete search history.

(56) References Cited

U.S. PATENT DOCUMENTS

| 5,495,608 | A | 2/1996 | Antoshenkov |
| 5,560,007 | A | 9/1996 | Thai |
| 5,666,528 | A | 9/1997 | Thai |
| 6,112,198 | A | 8/2000 | Lohman et al. |
| 6,192,358 | B1 | 2/2001 | Fuh et al. |
| 6,353,818 | B1 | 3/2002 | Carino |
| 2003/0229635 | A1 | 12/2003 | Chaudhuri |
| 2004/0220923 | A1 | 11/2004 | Nica |
| 2006/0031200 | A1 | 2/2006 | Santosuosso |
| 2006/0074874 | A1 | 4/2006 | Day et al. |
| 2007/0016558 | A1 | 1/2007 | Bestgen et al. |
| 2008/0270392 | A1* | 10/2008 | Day et al. ........................... 707/5 |

OTHER PUBLICATIONS

Richard L. Cole et al., "Optimization of Dynamic Query Execution Plans", 1994, ACM, NY, SIGMOD-94, pp. 150-161.
Chaudhuri et al., "Optimization of Queries with User-defined Predicates", 1997, ACM Transactions on Database Systems, pp. 0-39 (originally pp. 87-98, bibdata page added).
He et al., "Self-tuning UDF Cost Modeling Using the Memory-Limited Quadtree", Feb. 2004, Advances in Database Technology—EDBT 2004, Springer Berline / Heidelberg, pp. 79-87.

* cited by examiner

*Primary Examiner* — Diane Mizrahi
(74) *Attorney, Agent, or Firm* — Roy W. Truelson

(57) ABSTRACT

A query engine (or optimizer) which supports database queries having user-defined functions maintains historical execution data with respect to each of multiple user-defined functions. The historical execution data is dynamically updated based on query execution performance. When executing a query having user-defined functions, the query engine uses the historical execution data to predict an optimal evaluation ordering for the query conditions and, preferably, to dynamically adjust the evaluation order when appropriate. Preferably, the historical execution data includes historical execution time of the user-defined function and proportion of evaluated records which satisfied the query parameters.

19 Claims, 6 Drawing Sheets

OPTIMIZING EXECUTION OF DATABASE QUERIES CONTAINING USER-DEFINED FUNCTIONS

CROSS REFERENCE TO RELATED APPLICATION

This is a continuation of pending U.S. patent application Ser. No. 10/901,610, filed Jul. 29, 2004, entitled "Method and Apparatus for Optimizing Execution of Database Queries Containing User-Defined Functions", which is herein incorporated by reference. This application claims priority under 35 U.S.C. §120 of U.S. patent application Ser. No. 10/901, 610, filed Jul. 29, 2004.

This application is also related to U.S. patent application Ser. No. 12/167,353, filed Jul. 3, 2008.

FIELD OF THE INVENTION

The present invention relates generally to digital data processing, and more particularly to the generation and execution of database queries in a digital computer system.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises hardware in the form of one or more central processing units (CPU) for processing instructions, memory for storing instructions and other data, and other supporting hardware necessary to transfer information, communicate with the external world, and so forth. From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed at which a computer system performs day-to-day tasks (also called "throughput") can be increased by making various improvements to the computer's hardware design, which in one way or another increase the average number of simple operations performed per unit of time. The overall speed of the system can also be increased by making algorithmic improvements to the system design, and particularly, to the design of software executing on the system. Unlike most hardware improvements, many algorithmic improvements to software increase the throughput not by increasing the average number of operations executed per unit time, but by reducing the total number of operations which must be executed to perform a given task.

Complex systems may be used to support a variety of applications, but one common use is the maintenance of large databases, from which information may be obtained. Large databases usually support some form of database query for obtaining information which is extracted from selected database fields and records. Such queries can consume significant system resources, particularly processor resources, and the speed at which queries are performed can have a substantial influence on the overall system throughput.

Conceptually, a database may be viewed as one or more tables of information, each table having a large number of entries (analogous to row of a table), each entry having multiple respective data fields (analogous to columns of the table). The function of a database query is to find all rows, for which the data in the columns of the row matches some set of parameters defined by the query. A query may be as simple as matching a single column field to a specified value, but is often far more complex, involving multiple field values and logical conditions.

To support queries, a database typically includes one or more indexes for some of the database fields. An index is a sorting of the records in one of the database tables according to the value of a corresponding field. For example, if the database table contains records about people, one of the fields may contain a birthdate, and a corresponding index contains a sorting of the records by birthdate. If a query requests the records of all persons born before a particular date, the sorted index is used to find the responsive records, without the need to examine each and every record to determine whether there is a match. A well-designed database typically contains a respective index for each field having an ordered value which is likely to be used in queries.

Execution of a query involves retrieving and examining records in the database according to some search strategy. For any given logical query, not all search strategies are equal. Various factors may affect the choice of optimum search strategy. In particular, where a logical AND of multiple conditions is specified, the sequential order in which the conditions are evaluated can make a significant difference in the time required to execute the query. The reason for this difference is that the first evaluated condition is evaluated with respect to all the records in a database table, but a later evaluated condition need only be evaluated with respect to the subset of records for which the first condition was true. Similarly, for a query involving a multiple conditions conjoined by a logical OR, a later evaluated condition need only be evaluated with respect to the subset of records for which an earlier condition was false.

To support database queries, large databases typically include a query engine which executes the queries according to some automatically selected search strategy, using the known characteristics of the database and other factors. Some large database applications further have query optimizers which construct search strategies, and save the query and its corresponding search strategy for reuse.

A query engine or optimizer can use the indexes and other known characteristics of the database provided by the database designer. However, many large databases further support the use of user-defined functions in the database queries. As used herein, a user-defined function includes any of various functions or procedures which may be embedded in a query to provide additional capability beyond mere comparison of values from database fields. One form of user-defined function is computer programming code, written by the user in any of various general programming languages, which returns a value in response to one or more input parameters from a database record. Such a user-defined function may accept one or more input parameters (often database field values), which are passed with the call to the function. Although the external interface is via the passed parameter(s) and the returned value(s), a user defined function behaves internally as any other computer programming code. It may have arbitrary complexity, including loops, branches, calls to other functions and procedures, etc. Another form of user-defined function is a stored procedure, which is a special procedure built through Structured Query Language (SQL), a well-known set of database query syntax supported by many database applications. A user defined function might also be a sub-query, i.e., a query (set of query conditions) within a query, which is usually re-used for different queries, and provides the capability to define queries of added complexity. A user-defined function may have arbitrary complexity. The database designer does not know in advance what the user-defined functions will be, and since these are under control of the user, it is difficult or impossible to construct indexes for user-defined function values.

Because most user-defined functions involve complex evaluations which take longer to execute than straightforward matching of query parameters to database field values, conventional query engines and optimizers typically evaluate user-defined functions last. I.e., any conditions other than user-defined functions are evaluated first in order to reduce the subset of records which must be evaluated using the user-defined function.

If a query contains multiple user-defined functions, a conventional engine or optimizer will typically arbitrarily choose one of the user-defined functions to evaluate first. E.g., the engine or optimizer may evaluate the first function specified in the search string. Unless the user understands the workings of the database sufficiently well to correctly specify the search order of user-defined functions (which relatively few users do), such an arbitrary choice is likely to be sub-optimal. If intelligent choices could be made when selecting the order of evaluation of multiple user-defined functions, the execution performance of such queries could be improved. A need therefore exists, not necessarily recognized, for an improved database query engine or optimizer which can automatically make intelligent choices in ordering the evaluation of user-defined functions.

SUMMARY OF THE INVENTION

A query engine (or optimizer) which supports database queries having user-defined functions maintains historical execution data with respect to each of multiple user-defined functions. The historical execution data is dynamically updated based on query execution performance. When executing a query having one or more user-defined functions, the query engine uses the historical execution data to predict an optimal evaluation ordering for the query conditions.

In the preferred embodiment, the historical execution data includes historical processor execution time of the user-defined function and historical yield, i.e., proportion of evaluated records which satisfied the query parameters for the user-defined function. These are combined to produce a predicted execution time for different evaluation orderings, and the ordering with the lowest predicted execution time is selected as the optimal ordering. It would alternatively be possible to use other or additional data to predict an optimal ordering.

In the preferred embodiment, all query conditions not involving any user-defined functions are evaluated before any user-defined functions, in order to reduce the number of user-defined function evaluations performed. The prediction of optimal evaluation ordering is performed only with respect to conditions which include user-defined functions, and therefore is performed only for queries having multiple user-defined functions. However, it would alternatively be possible to compare predicted execution times of conditions having user-defined functions with those not having user-defined, and in some cases to evaluate a condition having a user-defined function before a condition not having a user-defined function.

Although using historical data to predict evaluation times for user-defined functions is an imperfect method of prediction, and will not necessarily select the optimal evaluation ordering in every instance, it is an intelligent heuristic which will generally provide a better search strategy than random guessing, and reduce the average execution time of database queries.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
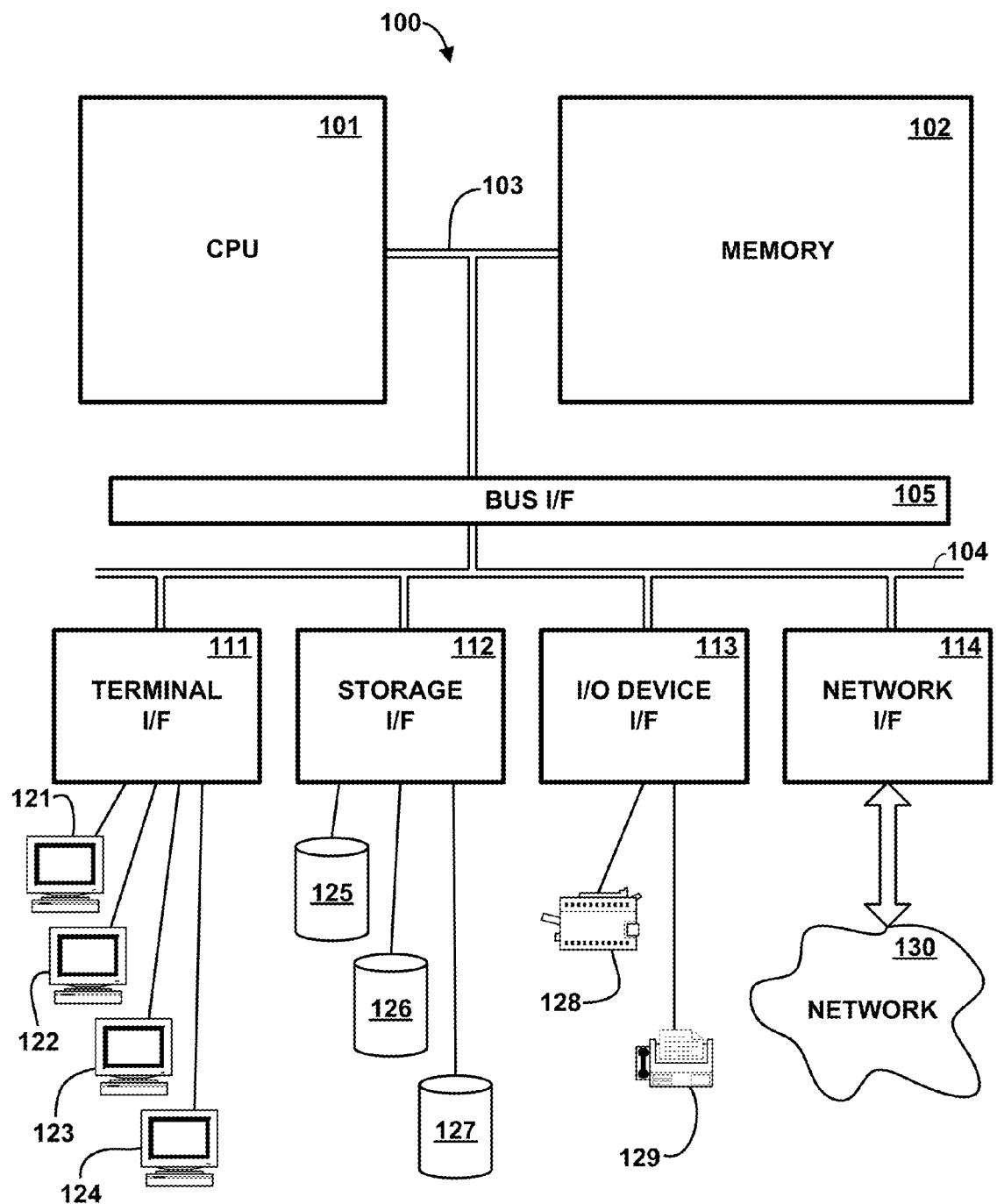
FIG. 1 is a high-level block diagram of the major hardware components of a computer system for optimizing the execution of database queries having user-defined functions, according to the preferred embodiment of the present invention.

Referring to the Drawing, wherein like numbers denote like parts throughout the several views, FIG. 1 is a high-level representation of the major hardware components of a computer system 100 for use in generating and executing database queries having user-defined functions, according to the preferred embodiment of the present invention. CPU 101 is a general-purpose programmable processor which executes instructions and processes data from main memory 102. Main memory 102 is preferably a random access memory using any of various memory technologies, in which data is loaded from storage or otherwise for processing by CPU 101.

Memory bus 103 provides a data communication path for transferring data among CPU 101, main memory 102 and I/O bus interface unit 105. I/O bus interface 105 is further coupled to system I/O bus 104 for transferring data to and from various I/O units. I/O bus interface 105 communicates with multiple I/O interface units 111-114, which may also be known as I/O processors (IOPs) or I/O adapters (IOAs), through system I/O bus 104. System I/O bus may be, e.g., an industry standard PCI bus, or any other appropriate bus technology. The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to an external network 130 for communication with one or more other digital devices. Network 130 may be any of various local or wide area networks known in the art. For example, network 130 may be an Ethernet local area network, or it may be the Internet. Additionally, network interface 114 might support connection to multiple networks.

It should be understood that FIG. 1 is intended to depict the representative major components of system 100 at a high level, that individual components may have greater complexity than represented in FIG. 1, that components other than or in addition to those shown in FIG. 1 may be present, and that the number, type and configuration of such components may vary, and that a large computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among CPU 101, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicate with system 100 over network 130. Computer system 100 may alternatively be a single-user system, typically containing only a single user display and keyboard input. Furthermore, while the invention herein is described for illustrative purposes as embodied in a single computer system, the present invention could alternatively be implemented using a distributed network of computer systems in communication with one another, in which different functions or steps described herein are performed on different computer systems.

While various system components have been described and shown at a high level, it should be understood that a typical computer system contains many other components not shown, which are not essential to an understanding of the present invention. In the preferred embodiment, computer system 100 is a computer system based on the IBM AS/400™ or i/Series™ architecture, it being understood that the present invention could be implemented on other computer systems.

Figure 2:
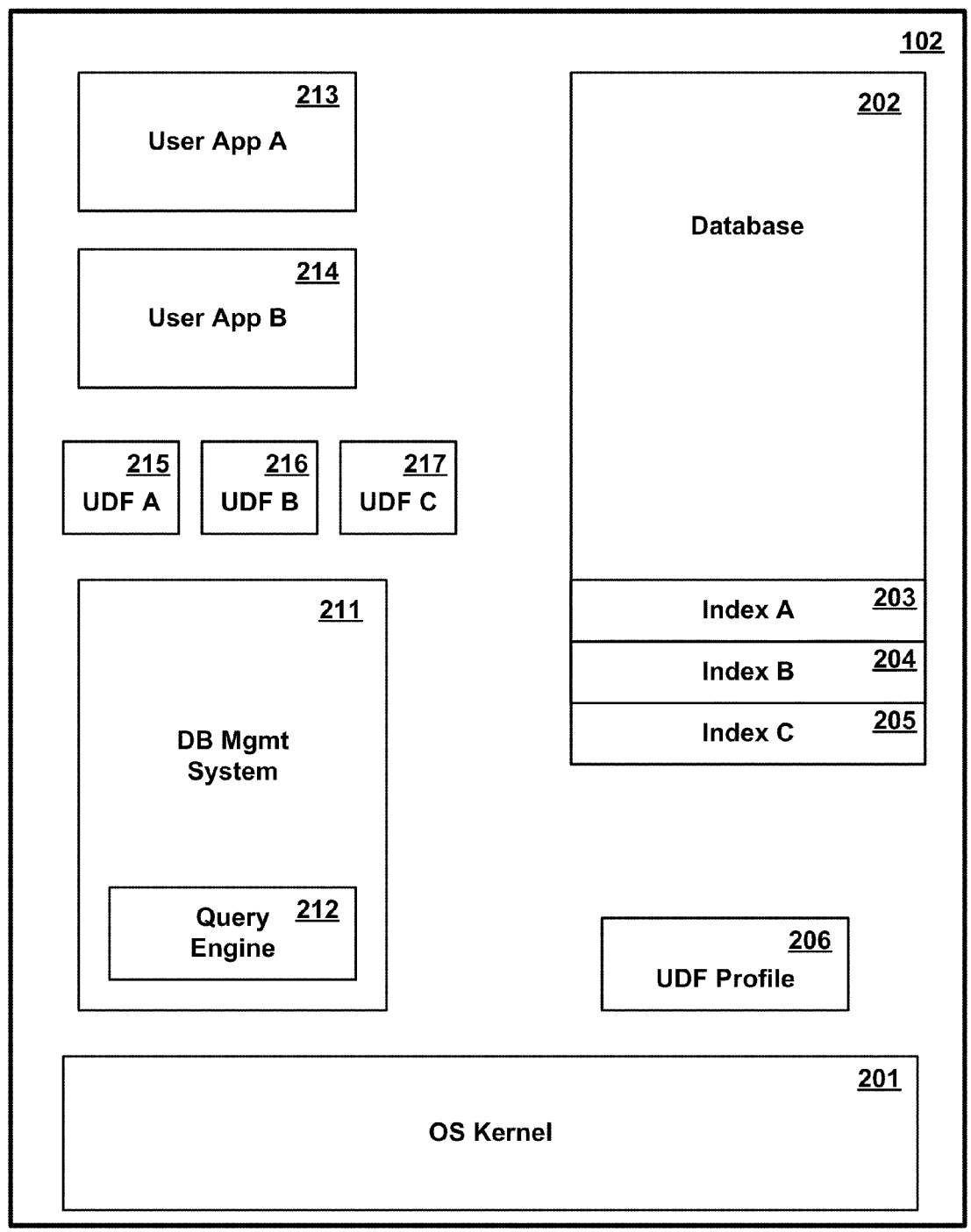
FIG. 2 is a conceptual illustration of the major software components of a computer system for optimizing the execution of database queries having user-defined functions, according to the preferred embodiment.

FIG. 2 is a conceptual illustration of the major software components of system 100 in memory 102. Operating system 201 provides various low-level software functions, such as device interfaces, management of memory pages, management and dispatching of multiple tasks, etc. as is well-known in the art. A structured database 202 contains data which is maintained by computer system 100 and for which the system provides access to one or more users, who may be directly attached to system 100 or may be remote clients who access system 100 through a network using a client/server access protocol. Database 202 contains a plurality of records, each record containing at least one (and usually many) fields, as is well known in the art. Database 202 might contain almost any type of data which is provided to users by a computer system. Associated with database 202 are multiple database indexes 203-205, each index representing an ordering of records in database 202 according to some specified criterion. Although only one database 202 and three indexes 203-205 are shown in FIG. 2, the computer system may contain multiple databases, and the number of indexes may vary (and typically is much larger). Alternatively, database 202 on system 100 may be logically part of a larger distributed database which is stored on multiple computer systems.

Database management system 211 provides basic functions for the management of database 202. Database management system 211 may theoretically support an arbitrary number of databases, although only one is shown in FIG. 2. Database management system 211 preferably allows users to perform basic database operations, such as defining a database, altering the definition of the database, creating, editing and removing records in the database, viewing records in the database, defining database indexes, and so forth. In particular, in accordance with the preferred embodiment, database management system includes a query engine 212 which supports the execution of queries against data in the database, as more fully described herein. Database management system 211 may further contain any of various more advanced database functions. Although database management system 211 is represented in FIG. 2 as an entity separate from operating system kernel 201, it will be understood that in some computer architectures various database management functions are integrated with the operating system.

In addition to database management system 211, one or more user applications 213, 214 executing on CPU 101 may access data in database 202 to perform tasks on behalf of one or more users. Such user applications may include, e.g., personnel records, accounting, code development and compilation, mail, calendaring, or any of thousands of user applications. Some of these applications may access database data in a read-only manner, while others have the ability to update data. There may be many different types of read or write database access tasks, each accessing different data or requesting different operations on the data. For example, one task may access data from a specific, known record, and optionally update it, while another task may invoke a query, in which all records in the database are matched to some specified search criteria, data from the matched records being returned, and optionally updated. Furthermore, data may be read from or written to database 202 directly, or may require manipulation or combination with other data supplied by a user, obtained from another database, or some other source. Although two applications 213, 214 are shown for illustrative purposes in FIG. 2, the number of such applications may vary. Applications 213, 214 typically utilize function calls to database manager 211 to access data in database 202, and in particular, to execute queries to data in the database, although in some systems it may be possible to independently access data in database 202 directly from the application.

System 100 further includes multiple user-defined functions (UDFs), of which three 215-217 are illustrated in FIG. 2. Each user-defined function 215-217 is callable from the query engine and/or other application program, and returns a value (or, in some cases, multiple values). A user-defined function may be part of a user application, or may be a stand-alone module, as illustrated in FIG. 2. Of particular significance to the present invention are user-defined functions which are used in database queries, where at least one of the passed parameters may be data (or a reference to data) in database 202. Such a user-defined function may be used almost entirely for database queries, or may be used for other purposes in addition to database queries.

In accordance with the preferred embodiment, system 100 further includes a user-defined function history profile 206. UDF profile 206 contains, for multiple user-defined functions, respective data relating to previous execution of the function, and particularly, execution in response to database queries. As explained in greater detail herein, UDF profile 206 is used by query engine 212 to predict an optimal query execution strategy, where a query contains user-defined functions.

Various software entities are represented in FIG. 2 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 2, it will be understood that the actual number of such entities may vary, and in particular, that in a complex database server environment, the number and complexity of such entities is typically much larger. Additionally, although software components 202-206 and 211-217 are depicted in FIG. 2 on a single computer system 100 for completeness of the representation, it is not necessarily true that all programs, functions and data will be present on a single computer system or will be performed on a single computer system. For example, user applications may be on a separate system from the database; a database may be distributed among multiple computer systems, so that queries against the database are transmitted to remote systems for resolution, and so forth.

While the software components of FIG. 2 are shown conceptually as residing in memory 102, it will be understood that in general the memory of a computer system will be too small to hold all programs and data simultaneously, and that information is typically stored in data storage devices 125-127, comprising one or more mass storage devices such as rotating magnetic disk drives, and that the information is paged into memory by the operating system as required. In particular, database 202 is typically much too large to be loaded into memory, and typically only a small portion of the total number of database records is loaded into memory at any one time. The full database 202 is typically recorded in disk storage 125-127. Furthermore, it will be understood that the conceptual representation of FIG. 2 is not meant to imply any particular memory organizational model, and that system 100 might employ a single address space virtual memory, or might employ multiple virtual address spaces which overlap.

Figure 3:
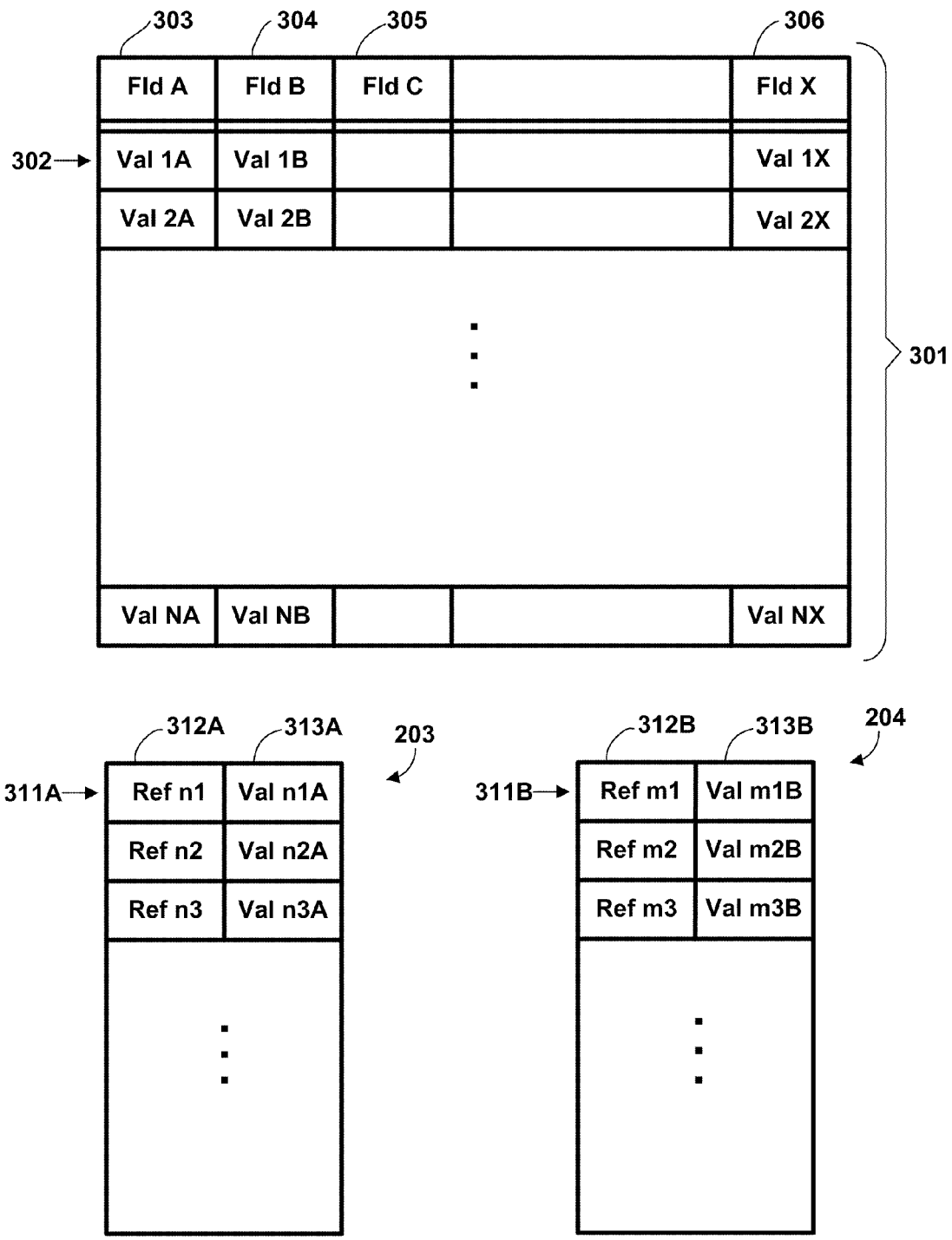
FIG. 3 is a conceptual representation of the structure of a database and associated database indexes upon which queries are performed, according to the preferred embodiment.

FIG. 3 is a conceptual representation of the structure of database 202 and associated database indexes 203, 204, containing data which can be analyzed by executing a logical query, according to the preferred embodiment. Database 202 comprises one or more database tables 301 (of which only one is shown in FIG. 3). Each table contains multiple database records 302, each record containing multiple data values logically organized as multiple data fields 303-306. Database 202 is conceptually represented in FIG. 3 as a table or array, in which the rows represent database records, and the columns represent data fields. However, as is well known in the art, the actual structure of the database in memory typically varies due to the needs of memory organization, accommodating database updates, and so forth. A database will often occupy non-contiguous blocks of memory; database records may vary in length; some fields might be present in only a subset of the database records; and individual records may be non-contiguous. Portions of the data may even be present on other computer systems. Various pointers, arrays, and other structures (not shown) may be required to identify the locations of different data contained in the database.

Because database 202 may contain a very large number of records, and it is frequently necessary to access these records in some logical (sorted) order, database indexes 203-205 provide a pre-sorted ordering of the database records according to some logical criterion. Typically, an index sorts the database according to the value of a specific field, the field being used to sort the database varying with the index. FIG. 3 represents two indexes 203, 204, where index 203 sorts database records according to the value of field A 303, and index 204 sorts database records according to the value of field B 304.

Conceptually, each index contains a plurality of entries 311A, 311B (herein generically referred to as feature 311), each entry 311 corresponding to a respective entry 302 in a database table 301, and containing a reference 312A, 312B (herein generically referred to as feature 312) and a value 313A, 313B (herein generically referred to as feature 313). The reference 312 is a reference to the corresponding entry 302 in database table 301. A reference could be a pointer, array index, record number, etc., which enables one to identify and access the corresponding database entry. The value 313 is the value from the field sorted by the index for the corresponding database entry. E.g., for index 203, which sorts database records according to the value of field A 303, the value 313A is the value of field A 303 for each corresponding database record. For an index, the entries are sorted so that values 313 are in a sorted order. Although indexes 203, 204 are represented conceptually in FIG. 3 as tables or arrays, a different structure, such as a binary tree, is typically used due to the need to update the indexes responsive to database updates, and to quickly identify the location of a desired value in the sorted order.

In accordance with the preferred embodiment, query engine 212 executes logical queries of database 202 using indexes 203-205. At least some of these queries include one or more user defined functions 215-217. I.e. the query requires evaluation of a logical statement which is performed by calling and executing one or more user-defined functions with respect to each of a plurality of database records. Where multiple user-defined functions are contained in a query, the resources (e.g. processor time) required to execute the query can depend on the order in which user-defined functions are evaluated. In order to select an optimum order of evaluation, the query engine looks at historical profile data regarding previous invocations of the user-defined functions, and uses this data to predict a optimum order of evaluation.

Figure 4:
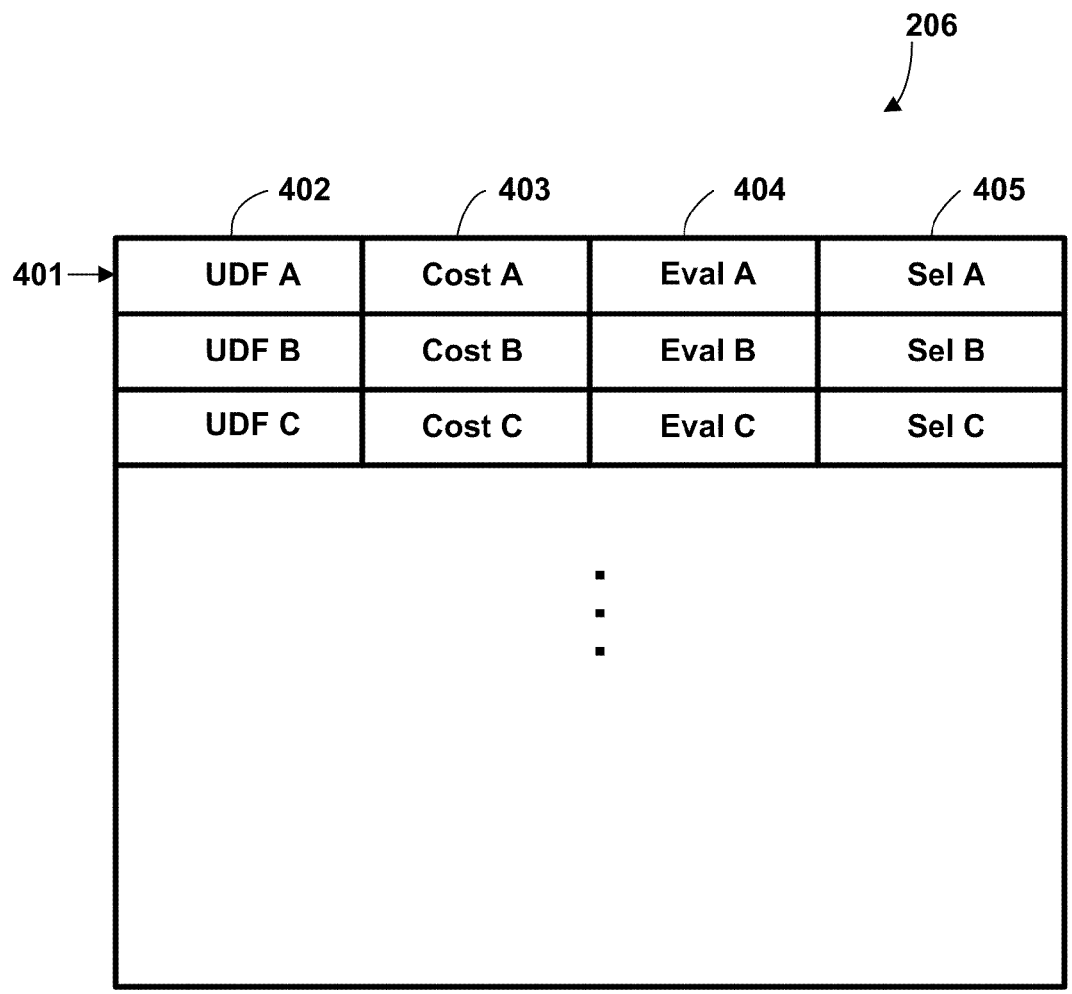
FIG. 4 is a conceptual representation of a user-defined function history profile, which is used to predict an optimum query execution strategy, according to the preferred embodiment.

FIG. 4 is a conceptual representation of the user-defined function history profile 206 which is used by the query engine to predict an optimum query execution strategy, according to the preferred embodiment. Referring to FIG. 4, the UDF profile 206 comprises a plurality of entries 401, each entry corresponding to a respective user-defined function 215-217. Each entry 401 contains a function reference field 402, a cumulative cost field 403, an evaluated field 404, and a selected field 405. Function reference field 402 uniquely identifies the user-defined function to which the profile entry 401 corresponds; this field could be a file name, a pointer, or any other data which can be used in the applicable computer system's architecture to uniquely identify the user-defined function.

Cumulative cost field 403 is a measure of the cumulative historical "cost" of executing the user-defined function. Cost is a general measurement reflecting the quantity of some resource or resources used. Cost can be metered in any of a variety of ways. In the preferred embodiment, cost is a measure of CPU time or CPU cycles required to execute the user-defined function. However, cost could alternatively take into account other or additional measures of consumed resources, such as response time, number of storage accesses, network bandwidth consumed, and so forth. Where resources on different computer systems in a distributed network are consumed, cost could be weighted for each system according to some suitable weighting criteria. Cost field 403 is an accumulation counter, which is incremented each time the user-defined function is executed.

Evaluated field 404 is a cumulative count of the number of times the user-defined function is invoked to evaluate some set of input parameters from database 202. Like cost field 403, evaluated field is incremented each time the user-defined function is executed, and therefore the quotient of cost field 403 divided by evaluated field 404 yields the average historical cost per invocation of the user-defined function.

Selected field 405 is a cumulative count of the number of times a parsed condition term of a logical expression containing a user-defined function within a query evaluates to "true". Like the cost field 403 and evaluated field 404, the selected field 405 is incremented with each query. The ratio of the selected field value to the evaluated field value is the historical average percentage of times that such a parsed term of a logical expression evaluated to "true". For predictive purposes before the query is executed, this historical average is assumed to be the probability that such a parsed term within a query will evaluate to "true".

For example, if Query Q is parsed into multiple terms conjoined by a logical AND operator, and contains a term of the form $UDFx(F_1,F_2)>K$, where UDFx is a user-defined function, F1 and F2 are fields within a record in database 202, and K is a constant, then Query Q is executed by evaluating $UDFx(F_1,F_2)$ with respect to multiple records in database 202. If $UDFx(F_1,F_2)$ is evaluated with respect to N records, and $UDFx(F_1,F_2)>K$ for M of those N records, then evaluated field 404 is incremented by N and selected field is incremented by M. Cost field 403 is incremented by the total CPU time required to execute the N function calls to UDFx.

In the preferred embodiment, cost field 403, evaluated field 404, and selected field 405 are incremented only when the user-defined function is invoked by the query engine 212 to satisfy a database query. It will be recognized that a user-defined function might be invoked in other circumstances, e.g., by an application program, to display or update data in database 202. However, the purpose of UDF profile 206 is to provide data for predicting the performance of queries, and for this reason historical query data is considered most representative. Additionally, in the absence of a query, selected field 405 has little meaning. It would alternatively be possible to take into account historical performance of a user-defined function when invoked for a purpose other than a query.

In the preferred embodiment, in order to reflect recent historical trends in user-defined function performance, and to avoid overruns in the cumulative counters, data in fields 403-405 is periodically aged. Preferably, aging involves multiplying each field 403-405 in a profile entry 401 by a constant between 0 and 1. Aging could be performed in response to any of various events, alone or in combination, such as one of the cumulative counters reaching a pre-defined threshold value, the expiration of a timer, or some pre-determined number of queries having been performed. Aging might alternatively be performed each time a query is run which references the applicable user-defined function.

Among the functions supported by database management system 211 is the making of queries against data in database 202, which are executed by query engine 212. As is known, queries typically take the form of statements having a defined format, which test records in the database to find matches to some set of logical conditions. Typically, multiple terms, each expressing a logical condition, are connected by logical conjunctives such as "AND" and "OR". Because database 202 may be very large, having a very large number of records, and a query may be quite complex, involving multiple logical conditions, it can take some time for a query to be executed against the database, i.e., for all the necessary records to be reviewed and to determine which records, if any, match the conditions of the query.

The amount of time required to perform a complex query on a large database can vary greatly, depending on many factors. Depending on how the data is organized and indexed, and the conditions of the query, it may be desirable to evaluate records in a particular order, specifically to evaluate certain logical conditions before evaluating other logical conditions. For example, if a query contains a set of terms connected by logical AND conjunctives and one assumes sequential evaluation of terms, then a first term to be evaluated must be evaluated against all records in a database table, but a second term to be evaluated must only be evaluated against those records for which the first term evaluated to "true", and subsequent terms need only be evaluated against those records for which all prior terms evaluated to "true". In general, the number of records evaluated for a particular term decreases as the term comes later in the order of evaluation, and therefore, as a general rule, it is desirable to evaluate terms which can be evaluated quickly first, and to evaluate terms which require a greater amount of system resource later. However, another consideration is the proportion of records which do not satisfy the logical condition, and therefore do not need to be evaluated for subsequent terms. E.g., if 50% of the records fail to satisfy a first condition term, and 99% of the records fail to satisfy a second condition term, then it is generally desirable to evaluate the second condition first, since it means that the first condition need only be evaluated with respect to 1% of the records. Both these considerations, and possibly others, should be taken into account in selecting an optimum query execution strategy.

It will be noted that logical condition terms joined by the conjunctive "OR" can be converted to conditions joined by "AND" by negating the conditions, and again negating the logical conjunction of the conditions, and therefore similar principles apply. Furthermore, multiple conditions could be combined by a conjunctive to form a single condition which is part of a larger set of conditions at a different level of nesting. Well known techniques exist for dissecting queries involving combinations of different conjunctions and different nesting levels.

Figure 5A:
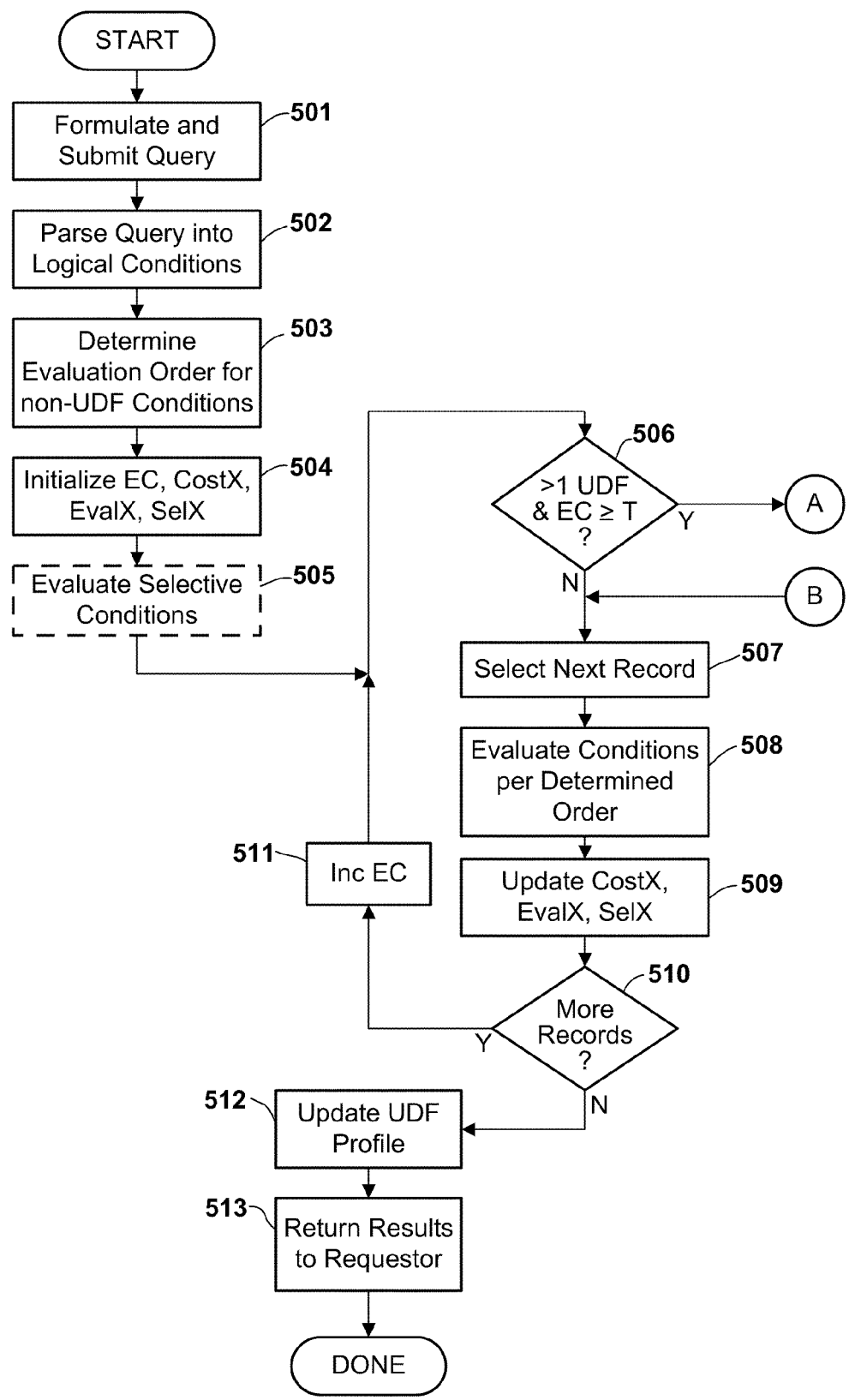
FIGS. 5A and 5B (herein collectively referred to as FIG. 5) are a flow diagram illustrating at a high level the process of executing a database query, according to the preferred embodiment.
Figure 5B:
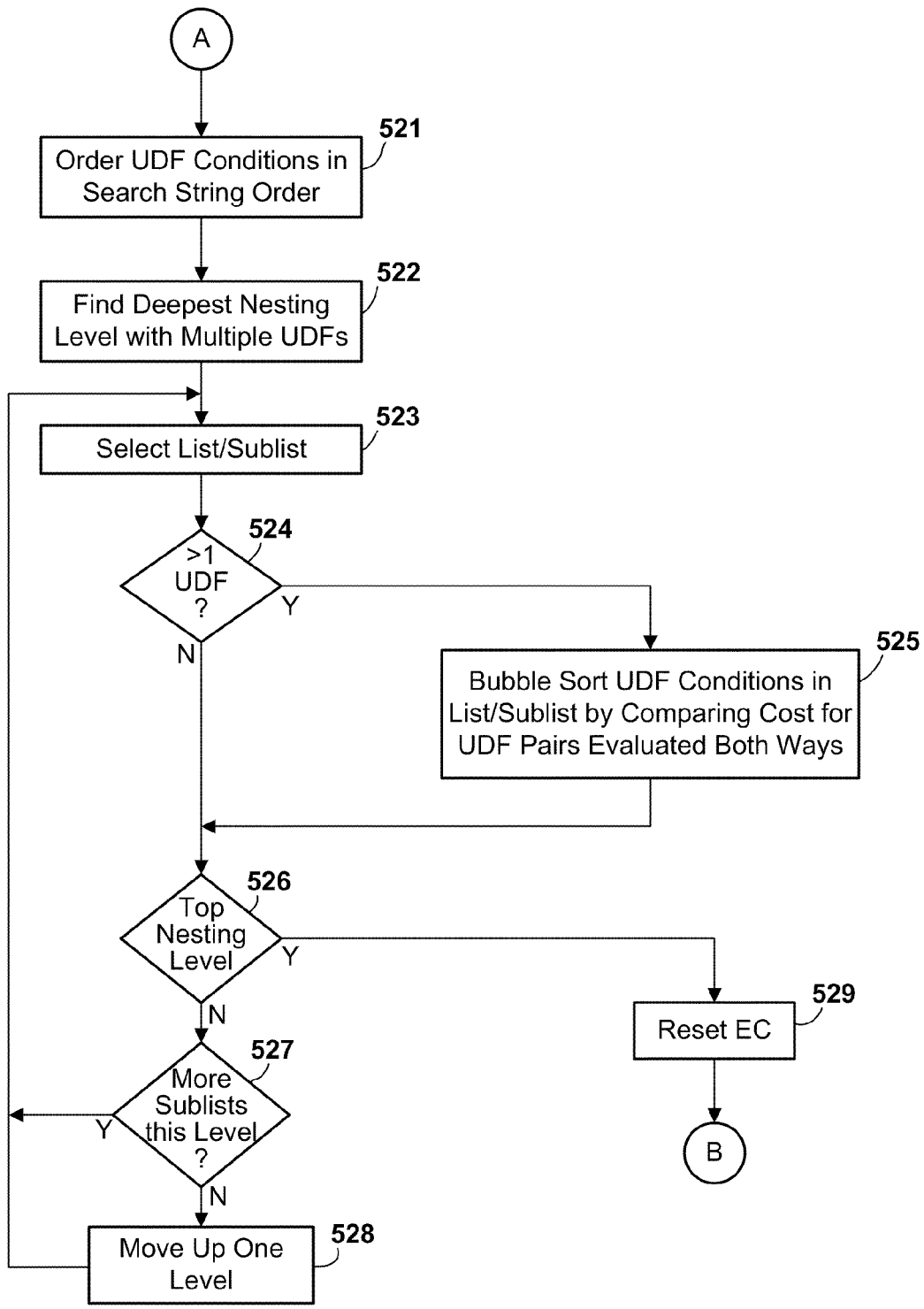

Query engine 212 automatically generates an execution strategy for performing a database query. FIGS. 5A and 5B (herein collectively referred to as FIG. 5) are a flow diagram illustrating at a high level the process of executing a database query, according to the preferred embodiment.

Referring to FIG. 5, a requesting user formulates and submits a database query using any of various techniques now known or hereafter developed (step 501). E.g., the database query might be constructed and submitted interactively using a query interface in database management system 211, might be submitted from a separate interactive query application program, or might be embedded in a user application and submitted by a call to the query engine 212 when the user application is executed. A query might be submitted from an application executing on system 100, or might be submitted from a remote application executing on a different computer system.

In response to receiving the query, query engine 212 parses the query into logical conditions (step 502), there being multiple conditions for all but the simplest of queries. Parsing step 502 produces a list of conditions to be evaluated in a logical query representation, which may include nested sub-lists of conditions within the list of conditions. The query engine analyzes the list of conditions and partially sorts the list in an evaluation order (step 503), i.e., in the order in which the conditions are to be evaluated. The list is partially sorted by (a) moving all conditions involving at least one user-defined function to the end of the sorting order, and (b) sorting all remaining conditions according to any algorithm, now known or hereafter developed, for optimizing the order of evaluation of conditions in a database query. Where nested sub-lists of conditions are involved, if at least one user-defined function appears in the sub-list, the entire sub-list is moved to the end of the sorting order. However, within any such sub-list, any conditions not involving a user-defined function are placed in sorted order ahead of conditions involving a user-defined function.

The query engine initializes an evaluation loop counter (EC) to a value in excess of a loop threshold, so that a procedure for determining the order of evaluation of user-defined functions as described herein is triggered initially, and further initializes arrays of CostX, EvalX and SelX values to zero (step 504). Each array CostX, EvalX, and SelX contains a value corresponding to each respective user-defined function contained in the query. The arrays are used to dynamically adjust the order of evaluation during query execution, as explained more fully herein.

In some cases, the query engine evaluates one or more logical conditions, not involving user-defined functions, with respect to all the records (represented as optional step 505). Specifically, where a condition involves an indexed value which can be rapidly evaluated by reference to the index, without examining all the records, it may be preferable to "evaluate" this condition first by generating a list of records satisfying the condition from the sorted index. Whether it is preferable to do so will depend on the number of records selected and other factors. Conventional algorithms exist for making such a determination. There could be multiple such indexed conditions, in which case the lists of records from multiple indexes would be logically ANDed before proceeding.

The query engine then decides whether it is necessary to determine or re-determine the order of evaluation of user-defined function conditions (step 506). If there are at least two user-defined function conditions, and the evaluation loop counter (EC) meets or exceeds some pre-defined threshold, then the 'Y' branch from step 506 is taken to determine the order of evaluation, as shown in steps 521-529; otherwise these steps are skipped. The threshold is simply an arbitrary number which causes the order of evaluation to be re-determined some periodic number of loop counts. The threshold could be as low as 1, forcing a re-determination with every iteration of the loop, but since some overhead is associated with re-determining the order of evaluation, the threshold is preferably some number substantially greater than 1, e.g., 1000. Alternatively, it would be possible to determine the order of evaluation of user-defined functions once and only once at the beginning of a query, and not to re-determine the order.

To sort the conditions involving user-defined functions, the user-defined function conditions are initially ordered in search-sting order (step 521), assuming that this was not already performed as part of step 503. I.e., the user-defined function conditions are placed in the order in which they are expressed by the requesting user in the query, but at the end of the list after conditions not involving user-defined functions.

The query engine analyzes the list of conditions to find the deepest nesting level having a sub-list with multiple user-defined functions (step 522). The query engine then selects a list or sub-list at the deepest nesting level (step 523). Where the deepest nesting level is the top level (which is often the case), the entire top level list is selected. If the selected list or sub-list does not contain more than one UDF condition, sorting is unnecessary, and the query engine proceeds to step 526.

If the selected list or sub-list contains multiple UDF conditions (the 'Y' branch from step 524), the query engine then sorts the UDF conditions in the selected list or sub-list using a bubble sort algorithm (step 525). To use a bubble sort, the query engine compares pairs of UDF conditions to determine which condition of a pair should be evaluated first, the condition to be first evaluated being placed earlier in the sorting order. For conditions involving only a single UDF (e.g., in which the value of a UDF is compared to a constant, a value of a database field, a system variable, etc.), this determination compares the values:

$$\frac{Cost(UDF_A)}{Eval(UDF_A)} + \left[\frac{Sel((UDF_A)}{Eval(UDF_A)} * \frac{Cost(UDF_B)}{Eval(UDF_B)}\right]; \text{ and} \quad (1)$$

$$\frac{Cost(UDF_B)}{Eval(UDF_B)} + \left[\frac{Sel((UDF_B)}{Eval(UDF_B)} * \frac{Cost(UDF_A)}{Eval(UDF_A)}\right]; \quad (2)$$

where $Cost(UDF_A)$ is the cumulative cost associated with User Defined Function A ($UDF_A$), $Sel(UDF_A)$ is the cumulative number selected associated with $UDF_A$, and $Eval(UDF_A)$ is the cumulative number evaluated associated with $UDF_A$, and similarly for User Defined Function B.

For the initial determination, the cumulative cost associated with $UDF_A$ is the value from field 403 of the entry in UDF profile 206 corresponding to $UDF_A$, the cumulative number selected is the value from field 405 of the entry in UDF profile 206 corresponding to $UDF_A$, and the cumulative number evaluated is the value from field 404 of the entry in UDF profile 206 corresponding to $UDF_A$, and similarly for User Defined Function B. However, for subsequent re-determinations during query execution triggered by a pre-determined number of loop iterations having been reached, these numbers are weighted averages of the initial values from UDF profile 206 and dynamically updated values from the arrays of CostX, EvalX, and SelX values corresponding to each respective user-defined function. Any suitable weighting formula can be used, and preferably the relative weight of the values from the CostX, EvalX and SelX arrays increases with increasing numbers of evaluations performed in the current query. For sufficiently large numbers of iterations or evaluations, the weighting formula might assign 100% weight to the values from the CostX, EvalX and SelX arrays. By thus using data from the current query, the most reliable, up-to-date historical performance data is used. This is particularly significant in the case of the number selected value, since such a value is very query-dependent. Notwithstanding the fact that queries run in the past have yielded a certain average value of number selected, the current query might be substantially different, and dynamic updating of the historical values permits greater accuracy in determining an optimum order of evaluation. As used herein, "historical" cost, evaluation, selected, and other function performance data includes either or both recent historical performance data (e.g., from the CostX, EvalX and SelX array) as well as more remote historical performance data (from the UDF profile 206).

The term $Cost(UDF_A)/Eval(UDF_A)$ reflects the average historical "cost" for each invocation of $UDF_A$. If $UDF_A$ is evaluated before $UDF_B$, then $UDF_B$ need only be evaluated with respect to the share of database entries for which the condition involving $UDF_A$ is true. Based on historical data, this share is estimated to be $Sel(UDF_A)/Eval(UDF_A)$. Therefore, if term (1) above is less than term (2), $UDF_A$ should be evaluated first and is placed before $UDF_B$ in the evaluation order (and vice versa).

It will be recognized that expressions (1) and (2) above can be simplified for computational purposes by algebraic manipulation to compare the quantities:

$$Cost(UDF_A)*Eval(UDF_B)+Sel(UDF_A)*Cost(UDF_B);$$
and
$$Cost(UDF_B)*Eval(UDF_A)+Sel(UDF_B)*Cost(UDF_A).$$

Alternatively, data may be stored in UDF profile 206 in a pre-computed form (e.g., as a pre-computed ratio). Other algebraic manipulations may be possible to simplify the required computations.

The basic principles above can be extended to those cases where a single logical condition involves multiple user-defined functions. In such cases, the cost of evaluating the condition is the sum of the average cost for each of the user-defined functions. E.g., if a logical condition is of the form $UDF_X > UDF_Y$, then the cost of evaluating this condition is the sum of the costs of evaluating $UDF_X$ and $UDF_Y$. In this case the proportion selected is much more difficult to predict. Preferably, the lower of the two UDF selected proportions is used as an approximation.

Although a specific formula is described herein as a preferred embodiment, it will be recognized that numerous variations are possible in the type of data maintained in UDF profile 206 or the dynamic arrays CostX, EvalX and SelX, and the predictive formula used to determine the ordering of user-defined function evaluations. For example, UDF profile could additionally maintain data relating to the variance or standard deviation of cost and proportion selected. Additional parameters might be of further predictive value.

When the list or sub-list is completely sorted, the query engine proceeds to step 526. If the just sorted list was the top level list (the 'Y' branch from step 526), sorting is finished and the query engine resets the evaluation loop counter (EC) (step 529), and proceeds to step 507 to select the next record to evaluate. If not the query engine determines whether any more sub-lists exist at the same nesting level (step 527). If another sub-list exists at this level (the 'Y' branch from step 527), the query engine selects the next sub-list (step 523), and sorts the selected sub-list using the procedure described above with respect to step 524-525. Otherwise, the query engine moves up one level of nesting (step 528), and selects a list or sub-list from the new level for sorting (step 523).

When sorting of the UDF conditions is completed as described above, the query engine selects a next database record for evaluation (step 507), and evaluates the logical conditions with respect to the selected record in the pre-determined order (step 508), using any known technique or technique hereafter developed. In general, for user-defined functions, evaluation means that the user-defined function will be separately called in the pre-determined order, until a logical result is determined or all conditions evaluated. E.g., for a conjunction of logical ANDs, each successive condition is evaluated until a condition returns "false" (which obviates the need to evaluate any further conditions) or until all conditions are evaluated.

The query engine updates the CostX, EvalX and SelX arrays by incrementing the corresponding CostX and EvalX array values for any user-defined functions which were actually evaluated, and the corresponding SelX values for any user-defined functions for which the condition evaluated to "true" (step 509).

If any further records remain to be evaluated, the 'Y' branch is taken from step 510, the evaluation loop counter is incremented (step 511), and the query engine returns to the head of the evaluation loop at step 506. When all records have been evaluated, the query engine proceeds to step 512.

With the evaluations complete, the query engine updates UDF profile 206 by incrementing the various accumulation counters with the cost, selected and evaluated counts of each user-defined function called in the query (step 512). Preferably, these counts are maintained as program variables CostX, EvalX and SelX in memory during the execution.

The query engine then generates and returns results in an appropriate form (step 513). E.g., where a user issues an interactive query, this typically mean returning a list of matching database entries for display to the user. A query from an application program may perform some other function with respect to database entries matching a query. Although step 513 is represented in FIG. 5 as occurring after all evaluation has been performed, in many applications partial query results will be returned to the user as they are generated (e.g., just before step 510).

The process of executing a query is shown and described herein as a single-threaded process for clarity of illustration and understanding. Although such a process could indeed be executed as a single thread, it will be recognized by those skilled in the art that queries may also be executed as multi-threaded processes, either on a single processor or multiple processors, and multiple user-defined functions may be running in parallel during the query execution. Notwithstanding that some threads execute in parallel, it is still advantageous for various reasons to order the UDFs in the most efficient logical order as described herein. It is unlikely that all conditions are evaluated simultaneously and independently by separately running threads, and to the extent the evaluation of any condition is dependent on or serially follows another, it makes sense to order the evaluation of conditions in an optimal logical order. The present invention is not limited to single-threaded environments, or to any particular number of threads or processes.

In the preferred embodiment described above, the generation and execution of the query is described as a series of steps in a particular order. However, it will be recognized by those skilled in the art that the order of performing certain steps may vary, and that variations in addition to those specifically mentioned above exist in the way particular steps might be performed. In particular, in some environments database queries are analyzed and compiled into an intermediate representation or set of callable or executable instructions, and are saved for use multiple times. In these cases, the steps of formulating the query and parsing it into a logical representation might be performed long before the query is executed. In such an environment, the order of execution might be determined once at compile time for multiple executions, or it might be deferred until execution time (and thus determined separately for each execution) to obtain the full benefit of algorithms which take into account changes to the database.

In the preferred embodiment, historical data from previous queries is maintained in a profile, and is averaged on a weighted basis with historical data from the current query during execution to dynamically adjust the evaluation order. However, it would alternatively be possible to use only historical data from previous queries in determining the order of execution, thus determining the order only once at the beginning of a query. This alternative may be desirable where, as in some database architectures, evaluation is performed by sequentially evaluating a first user-defined function with respect to all records before evaluating a second user-defined function. As a further alternative, it would be possible to use only historical data from the current query, without maintaining a profile of performance data from previous queries.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 1 as system memory 102, and as data storage devices 125-127.

Although a specific embodiment of the invention has been disclosed along with certain alternatives, it will be recognized by those skilled in the art that additional variations in form and detail may be made within the scope of the following claims:

What is claimed is:

1. A method for database query optimization in a computer system, comprising the steps of:
    maintaining historical execution data with respect to each of a plurality of user-defined functions, said historical execution data comprising respective at least one measure of average cost of evaluation of each of said plurality of user-defined functions;
    receiving a database query having a plurality of logical conditions, said database query including at least one of said user-defined functions in at least one of said logical conditions;
    using the respective at least one measure of average cost of evaluation from said historical execution data of each user-defined function contained in said query to predict an optimal ordering of evaluation of said plurality of logical conditions; and
    evaluating said database query in accordance with said predicted optimal ordering of evaluation of said plurality of logical conditions.

2. The method for database query optimization of claim 1, wherein said database query includes a plurality of said user-defined functions, and wherein said step of using said historical execution data to predict an optimal ordering of evaluation comprises using said historical execution data to predict an optimal ordering of evaluation of said plurality of user-defined functions included in said database query.

3. The method for database query optimization of claim 1, wherein said historical execution data further comprises average proportion of database query logical conditions evaluating to "true" for each of said user-defined functions, and wherein the method further uses the respective average proportion of database query logical conditions evaluating to "true" from said historical execution data of each user-defined function contained in said query to predict said optimal ordering of evaluation of said plurality of logical conditions.

4. The method for database query optimization of claim 1, wherein said historical execution data comprises data from evaluation of said user-defined functions in satisfying said database query.

5. The method for database query optimization of claim 4, wherein said step of using historical execution data to predict an optimal ordering of evaluation comprises:
    periodically re-determining an optimal ordering of evaluation a plurality of times while evaluating said database query, wherein each successive periodic re-determination of an optimal ordering uses said data from evaluation of said user-defined functions in satisfying said database query, said data from evaluation of said user-defined functions in satisfying said database query being updated from each previous periodic re-determination of an optimal ordering.

6. The method for database query optimization of claim 4, wherein said step of using the respective at least one measure of average cost of evaluation from said historical execution data of each user-defined function contained in said query to predict an optimal ordering of evaluation of said plurality of logical conditions comprises using a weighted average of said data from evaluation of said user-defined functions in satisfying said database query and data from execution of said user-defined functions prior to evaluating said database query.

7. A computer-readable storage medium encoded with a computer program for database query optimization comprising:
- a plurality of processor executable instructions recorded on tangible computer-readable media, wherein said instructions, when executed by at least one processor of at least one computer system, cause the at least one computer system to perform the steps of:
- maintaining historical execution data with respect to each of a plurality of user-defined functions;
- receiving a database query having a plurality of logical conditions, said database query including at least one of said user-defined functions in at least one of said logical conditions;
- using said historical execution data to predict an optimal ordering of evaluation of said plurality of logical conditions; and
- evaluating said database query in accordance with said predicted optimal ordering of evaluation of said plurality of logical conditions.

8. The computer program product of claim 7, wherein said database query includes a plurality of said user-defined functions, and wherein said step of using said historical execution data to predict an optimal ordering of evaluation comprises using said historical execution data to predict an optimal ordering of evaluation of said plurality of user-defined functions included in said database query.

9. The computer program product of claim 7, wherein said historical execution data comprises average cost of evaluation of each of said user-defined functions.

10. The computer program product of claim 7, wherein said historical execution data comprises average proportion of database query logical conditions evaluating to "true" for each of said user-defined functions.

11. The computer program product of claim 7, wherein said historical execution data comprises data from evaluation of said user-defined functions in satisfying said database query.

12. The computer program product of claim 11, wherein said step of using historical execution data to predict an optimal ordering of evaluation comprises using a weighted average of said data from evaluation of said user-defined functions in satisfying said database query and data from execution of said user-defined functions prior to evaluating said database query.

13. The computer program product of claim 7, wherein said historical execution data comprises data from execution of said user-defined functions prior to evaluating said database query.

14. The computer program product of claim 7, wherein said step of using said historical execution data to predict an optimum order of evaluation comprises predicting that logical conditions not containing user-defined functions be evaluated first, and, among multiple logical conditions containing respective user-defined functions, predicting an optimal order of evaluation using said historical execution data.

15. A computer system, comprising:
- at least one processor;
- a data storage for storing a database;
- a database management facility embodied as a plurality of instructions executable on said at least one processor, said database management facility including a query engine which executes logical queries against said database, each logical query containing a respective set of logical conditions, at least some of said respective sets of logical conditions containing one or more logical conditions including respective one or more user-defined functions;
- wherein said database management facility automatically maintains historical execution data for each of a plurality of said user-defined functions, said historical execution data including a respective relative average evaluation cost for each of said plurality of said user-defined functions;
- wherein said database management facility automatically predicts a respective optimal ordering of evaluation of each of a plurality of said respective sets containing one or more logical conditions including respective one or more user-defined functions using respective historical execution data for each said user-defined function, and automatically executes the query containing the respective set according to the predicted optimal ordering of evaluation.

16. The computer system of claim 15, wherein said historical execution data further comprises a respective average proportion of logical conditions evaluating to "true" for each of said user-defined functions.

17. The computer system of claim 15, wherein said historical execution data used for predicting an optimal ordering of evaluation of each respective query comprises data from evaluation of said user-defined functions in satisfying the respective query.

18. The computer system of claim 15, wherein said historical execution data comprises data from execution of said user-defined functions prior to evaluating said database query.

19. The computer system of claim 15, wherein said step of using said historical execution data to predict an optimum order of evaluation comprises predicting that logical conditions not containing user-defined functions be evaluated first, and, among multiple logical conditions containing respective user-defined functions, predicting an optimal order of evaluation using said historical execution data.

* * * * *